United States Patent
Ashwood-Smith et al.

(10) Patent No.: US 8,081,566 B1
(45) Date of Patent: Dec. 20, 2011

(54) METHOD AND APPARATUS FOR INDICATING CONGESTION IN A SOURCE ROUTED NETWORK

(75) Inventors: Peter Ashwood-Smith, Hull (CA); Donald Fedyk, Groton, MA (US)

(73) Assignee: Rockstar BIDCO, LLP, New York, NY (US)

( * ) Notice: Subject to any disclaimer, the term of this patent is extended or adjusted under 35 U.S.C. 154(b) by 963 days.

(21) Appl. No.: 10/827,181

(22) Filed: Apr. 19, 2004

(51) Int. Cl.
*G01R 31/08* (2006.01)
*G06F 11/00* (2006.01)
*H04J 1/16* (2006.01)
*H04J 3/14* (2006.01)

(52) U.S. Cl. ...................... 370/230; 370/237

(58) Field of Classification Search ........... 370/229–237
See application file for complete search history.

(56) References Cited

U.S. PATENT DOCUMENTS

| | | | |
|---|---|---|---|
| 5,600,798 A * | 2/1997 | Cherukuri et al. | 709/232 |
| 6,529,475 B1 * | 3/2003 | Wan et al. | 370/231 |
| 6,922,390 B1 * | 7/2005 | Chapman et al. | 370/229 |
| 2003/0189901 A1 * | 10/2003 | Ozugur et al. | 370/230 |

* cited by examiner

*Primary Examiner* — Chirag Shah
*Assistant Examiner* — Srinivasa Reddivalam
(74) *Attorney, Agent, or Firm* — Withrow & Terranova, PLLC

(57) ABSTRACT

A packet header in a source routed network is augmented to include, with each hop identifier, at least one bit for indicating congestion at the particular hop. As the packet traverses from the source to the destination, when congestion is detected at a hop, a congestion bit associated with the hop is set in the header. At the destination, when another packet is forwarded from the destination to the source on the same path, the congestion bits are reflected back to the source. When the source receives the congestion bits, it has the option of re-routing subsequent communications between the source and destination nodes by generating a new hop list, which routes around one or more of the congested hops.

30 Claims, 9 Drawing Sheets

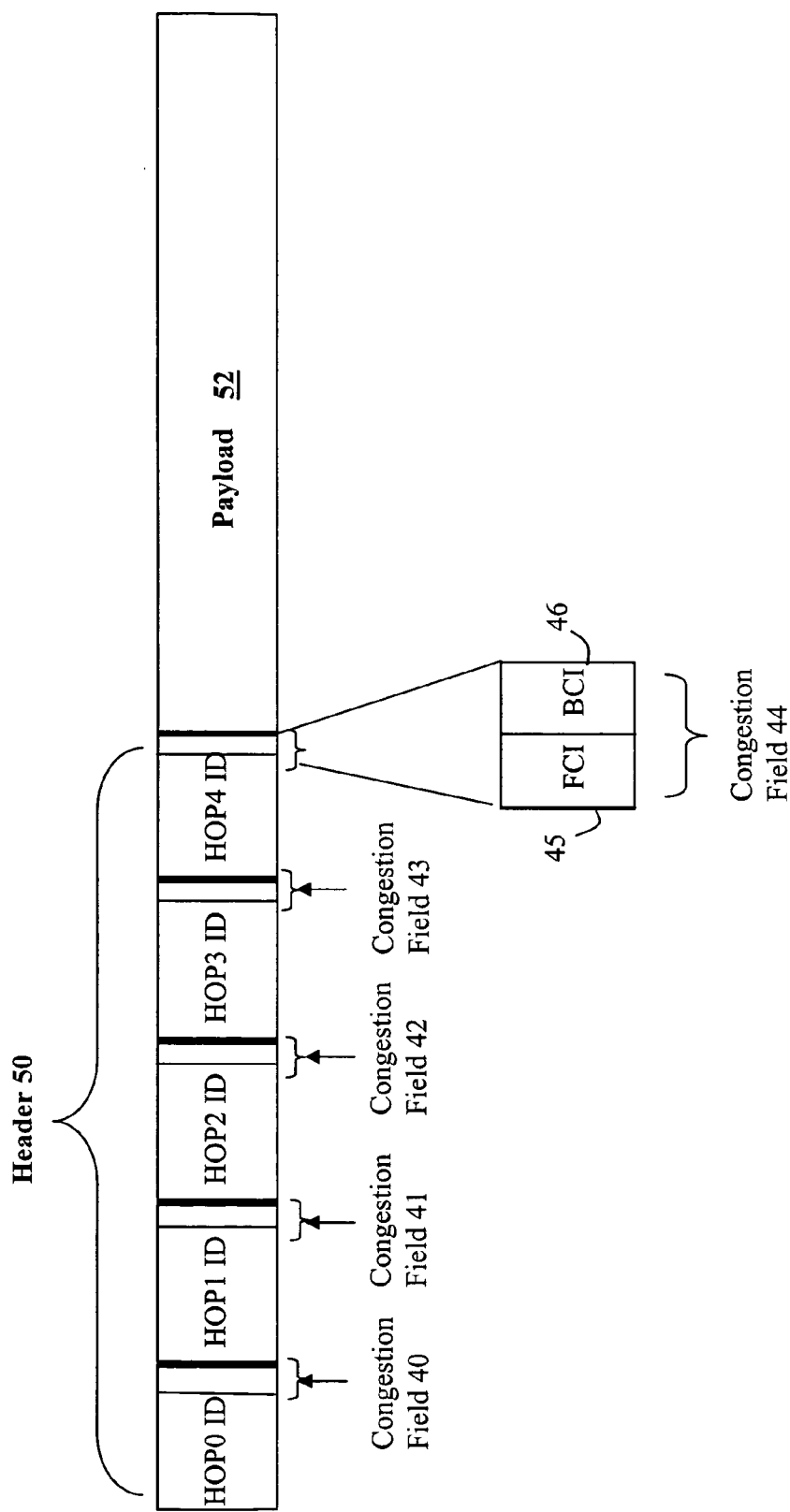

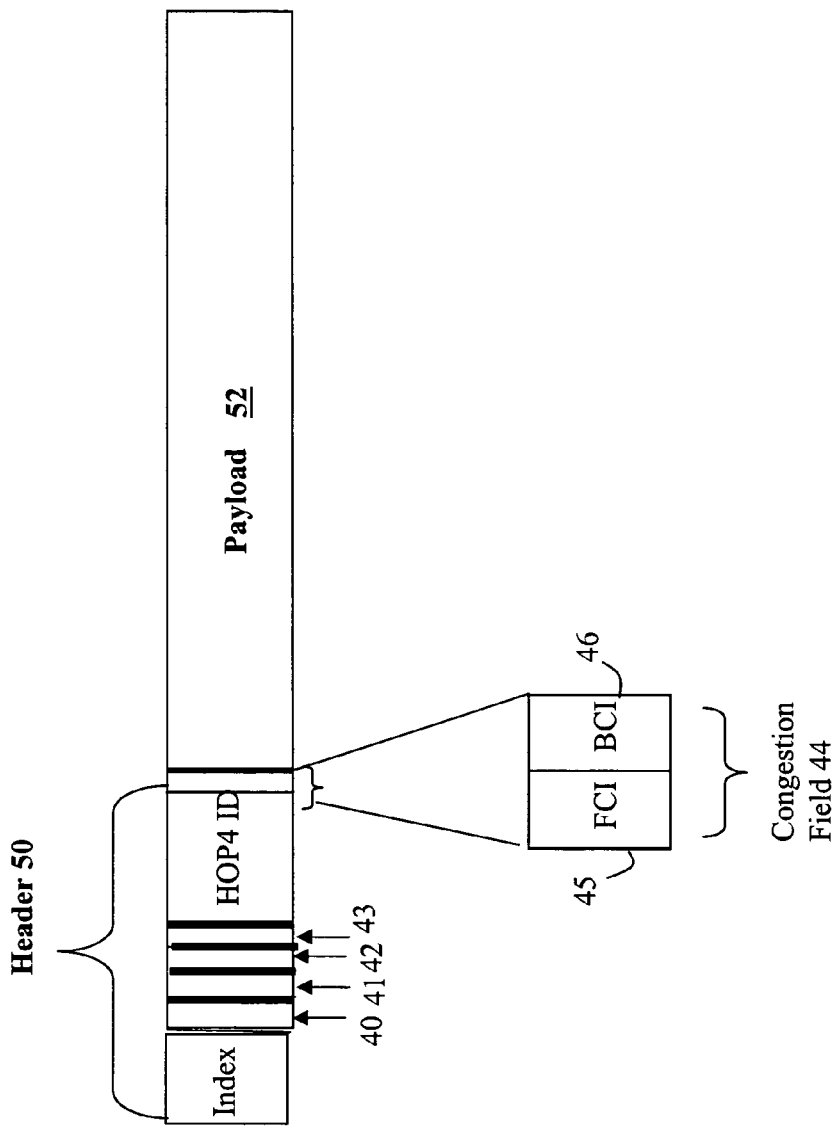

METHOD AND APPARATUS FOR INDICATING CONGESTION IN A SOURCE ROUTED NETWORK

FIELD OF THE INVENTION

This invention relates generally to the field of networking and more specifically to a method and apparatus for congestion detection and management in a source routed network.

BACKGROUND OF THE INVENTION

In a network communications system, generally a packet forwarded from a source node traverses numerous intermediate nodes before the desired destination node is reached. Along the way, the packet may be delayed by congestion at various ones of the intermediate nodes. Various mechanisms exist for signaling the source node that the packet is being delayed on its path to the destination. For example, in a frame relay network, FECN (forward explicit congestion notification) is a header bit transmitted by the source (sending) terminal requesting that the destination (receiving) terminal slow down its requests for data. BECN (backward explicit congestion notification) is a header bit transmitted by the destination terminal requesting that the source terminal send data more slowly. FECN and BECN are intended to minimize the possibility that packets will be discarded (and thus have to be resent) when more packets arrive than can be handled.

If the source terminal in a communications circuit generates frequent FECN bits, it indicates that the available network bandwidth (at that time) is not as great as can be supported by the destination terminal or some intermediate node in the path between the source and destination terminal. Likewise, if the destination generates frequent BECN bits, it means the available network bandwidth (at that time) is not as great as can be supported by the source. In either case, the root cause is lack of available bandwidth at the times during which FECN or BECN bits are generated. This can occur because of outdated or inadequate network infrastructure, heavy network traffic through at least a portion of the path, high levels of line noise, or portions of the system going down. Identifying and resolving these issues can improve overall network performance, especially when the system is called upon to carry a large volume of traffic.

However, while the FECN and BECN bits may be used to identify that congestion exists in a path, they do little to indicate exactly where in the path the congestion is occurring. For example, an overloaded intermediate node in the path has the effect of delaying communication over the entire path, thus causing the FECN/BECN bits to be set to regulate delays and packet loss. Backing off on the transmission bandwidth may reduce congestion at the one overloaded node, but it does not fully utilize the capacity of the remaining nodes in the path. It would be desirable to develop a mechanism which would enable congestion to be controlled within a network without unreasonably sacrificing network bandwidth.

SUMMARY OF THE INVENTION

In source routed network a source provides a list of 'hop' identifiers in each header of a packet transmitted between the source and a desired destination. Each hop identifier provides an indication of a link, node, label, etc, that the packet is to traverse on a path from the source to the desired destination. According to one aspect of the invention, the packet header in a source routed network is augmented to include, with each hop identifier, at least one bit for indicating congestion at the particular hop. As the packet traverses from the source to the destination, when congestion is detected at a hop, a congestion bit associated with the hop is set in the header. At the destination, when another packet is forwarded from the destination to the source on the same path, the congestion bits are reflected back to the source. When the source receives the congestion bits, it has the option of re-routing subsequent communications between the source and destination nodes by generating a new hop list, which routes around one or more of the congested hops.

According to one aspect of the invention, a node disposed in a path between a source node and a destination node in a source routed network includes an apparatus for indicating congestion at the node. The apparatus includes packet forwarding logic for forwarding a packet received at the node, the packet including a header having a plurality of ordered bit fields, each bit field including an identifier associated with a hop for a packet transmitted between the source and the destination, and a congestion field indicating congestion at the hop. The apparatus also includes means for setting the congestion field corresponding to the identifier associated with the node in response to an indication of congestion at the node. With such an arrangement, congestion in particular points in the path between the source and the destination can be tracked.

According to another embodiment of the invention, a source node in a source node routed network includes packet receive logic, for receiving a packet at the source node, the packet including a header having a plurality of ordered bit fields, each bit field including an identifier associated with a hop for a packet transmitted between the source and a destination, and a congestion field indicating congestion at the hop; and routing logic for identifying an updated route between the source and the destination responsive to one or more congestion fields in the header of the received packet. With such an arrangement, a source node in a source routing network can identify a new route between the source and destination which does not include the congested node(s), thereby enabling the full bandwidth potential of the path to be attained.

According to another aspect of the invention, a network device includes a packet memory, the packet memory for storing a packet received at the network device, the packet comprising a header, the header including a list of hops between a source and destination node, and for each hop in the list of hops, a congestion field for indicating a relative congestion at the associated hop. The network device also includes means for forwarding the packet from the packet memory to another device.

According to another aspect of the invention, a method for indicating congestion at a node in a source routed network including the steps of receiving a packet at the node, the packet including a header having a plurality of ordered bit fields, each bit field including an identifier associated with a hop for a packet transmitted between the source and the destination, and a congestion field indicating congestion at the hop, detecting a congestion condition at the node, and setting the congestion field corresponding to the identifier associated with the node in response to an indication of congestion at the node.

According to a further aspect of the invention, A method of generating a hop list in a source routed network including the steps of receiving, at a source, a packet from a destination, the packet including a plurality of bits associated with a plurality of hops between the source and the destination, and indicating a state of congestion at the associated hop; and generating a hop list identifying a plurality of hops to traverse in communications between the source and the destination, including selecting hops in the hop list in response to the indicated state of congestion at the associated hop.

According to another aspect of the invention, a source routed network comprising a source node and a destination node coupled in a path by a plurality of intermediate nodes, the source routed network including means for indicating a state of congestion of each of the plurality of intermediate nodes to the source node; and means, response to the state of congestion of each of the plurality of intermediate nodes, for updating the path of intermediate nodes between the source node and the destination node by removing at least one of the intermediate nodes from the path.

BRIEF DESCRIPTION OF THE DRAWINGS

FIG. 3 illustrates detail of the modified packet header of the present invention, which incorporates at least one congestion bit into the hop identifier of each hop in a hop list of a packet header;

FIG. 4 illustrates an alternate embodiment of the packet header of the present invention, wherein the packet header is collapsed as a packet traverses from a source to a destination;

DETAILED DESCRIPTION

As it is known in the art, in a source routed network, each source node essentially directs the flow of traffic from the source through any intermediate nodes in the network to the destination. The source pre-computes the preferred route, based upon any known routing protocol, compiles a list of the intermediate 'hops' that direct the packet over the preferred route, and appends the list of hops to the packet header. As the packet header is parsed at each intermediate node, the next 'hop' is retrieved from the list and the packet is forwarded to the next hop by the intermediate node. Source routing thus removes the need for routing calculations to be performed at intermediate nodes, allowing faster packet forwarding techniques to be used to improve communication bandwidth.

Figure 1A:
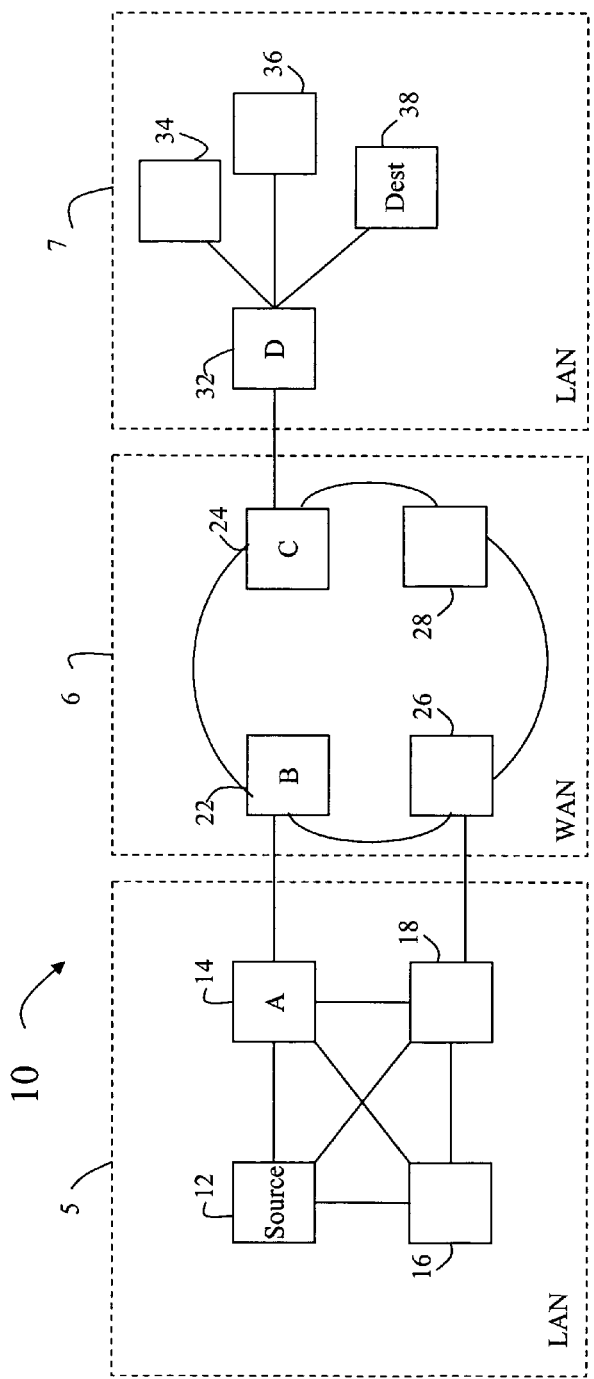
FIG. 1A is a block diagram of an exemplary source routed network in which the present invention may be used, the source routed network of FIG. 1A using node addresses for specifying a next hop.
Figure 1B:
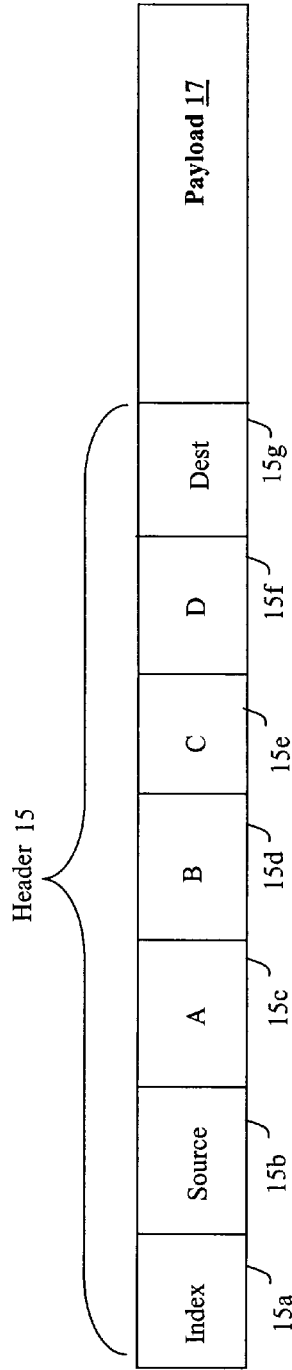
FIG. 1B illustrates exemplary packet header contents for a packet used in the source routed network of FIG. 1A.

Referring now to FIG. 1A, an exemplary network 10 in which source routing may be used is shown. A source device 12 that seeks to communicate with a destination device 38 executes a transport layer routing protocol, such as Open Shortest Path First (OSPF) routing protocol, IS-IS, or the like to select the desired 'hops' in the path from source to destination. For the purpose of this application, a 'hop' may be defined to be an address of a node, a link associated with a node or a label identifying a link or a node, although the invention is not limited to any particular hop identifier content. In FIGS. 1A and 1B, the 'hop' list is comprised of a sequence of node IP addresses or labels. Thus, the path from source to destination is conveyed, in FIGS. 1A and 1B, as a path of nodal addresses.

FIG. 1B illustrates a generic format of an Internet Protocol (IP) packet including a header portion 15 and a payload portion 17. The Internet Protocol (IP), defined by IETF RFC791, is the routing layer datagram service of the TCP/IP suite. Most protocols within the TCP/IP suite use IP to route frames from host to host. The IP frame header contains routing information and control information associated with datagram delivery. In FIG. 1B, the header portion is shown to include an index 15a, and a 'hop list' including address 15b corresponding to the source 12, address 15c corresponding to node A 14, etc.

As the packet is transferred through the network, the index is incremented. A node that receives the packet then uses the index to retrieve the appropriate 'next hop' from the hop list, increments the index, and forwards the packet onto the next hop. Thus, in FIG. 1A, Source 12 forwards the packet to node A 14. Node A 14 parses the header and uses the index to retrieve the next 'hop' B. Node A increments the index and forwards the packet to node B. The process continues until the packet reaches the destination node.

Figure 2A:
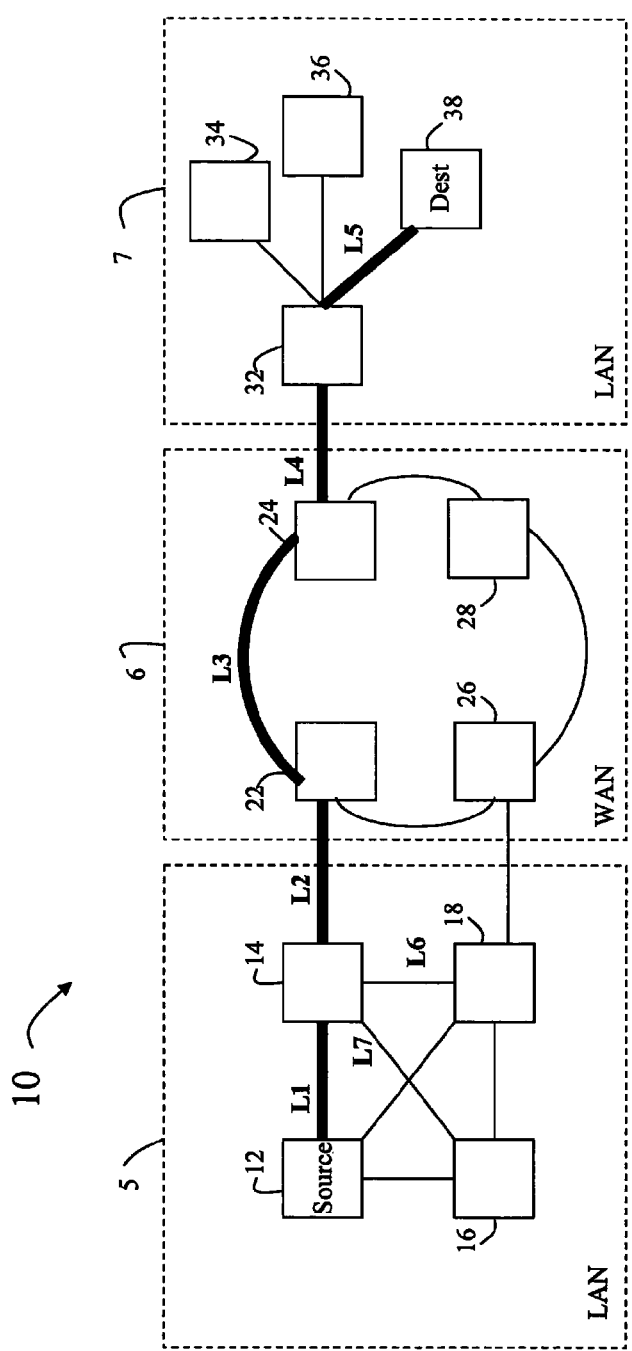
FIG. 2A is a block diagram of another exemplary source routed network in which the present invention may be used, the source routed network of FIG. 2A being a link routed network that uses link identifiers for specifying a next hop.
Figure 2B:
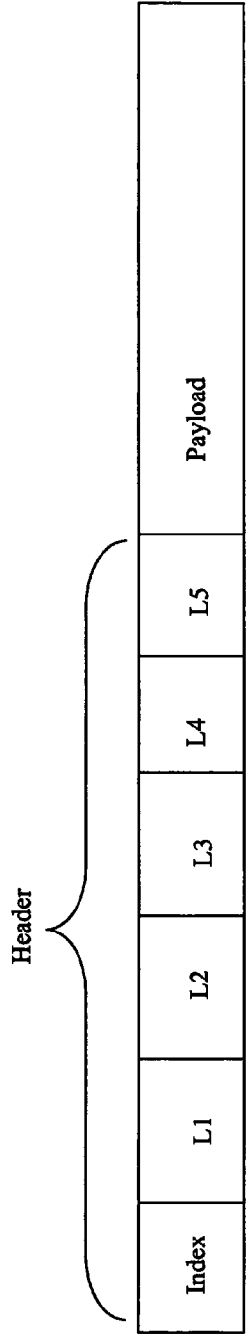
FIG. 2B illustrates exemplary packet header contents for a packet used in the link routed network of FIG. 2A.

Referring now to FIGS. 2A and 2B, a source routing network wherein links, rather than nodal addresses, are used to identify the next 'hop' in the network is shown. For the purpose of this application, a link identifies an interface of a network device which may be used to transmit data. Thus, in the network 5, device 14 has multiple output interface links (L1, L2, L6 and L7), any of which can be selected to as a path for the next 'hop' out of the device. The path from source node 12 to destination node 38 is thus indicated as link 'hops' L1, L2, L3, L4 and L5 as illustrated in FIG. 2B.

Referring now to FIG. 3, according to one aspect of the invention, the header 50 of a packet can be modified to include, with each hop identifier (whether it be a node address, link address, label or some other indicator), one or more bits comprising a congestion field, such as congestion fields 40, 41, 42, 43 and 44. The congestion field is associated with each 'hop', and indicates a relative congestion on the 'hop'. The existence of congestion at the 'hop' can be determined using any one of a variety of known congestion detection techniques, and the present invention is not limited to the use of any particular mechanism or threshold for congestion detection. Exemplary methods that are used in the art include monitoring transmit and receive buffer fullness at the device, measuring a number of dropped packets, measurement of a delay in response by the device, and may other methods. In one sense, 'Congestion' means resource conflicts with regard to the transport medium and buffers associated with packet traffic. However, the system and method of the present invention can also be used to indicate other resource conflicts; such as power, error rates, etc., and thus the terms 'congestion' and 'resource conflicts' can be used interchangeably below.

In FIG. 3, the congestion field is shown to include two bits; a Forward Congestion Indication bit 45 and a Backward Congestion indication bit 46. The Forward Congestion indication bit may be set at a given node if a packet is received at the node and there is evidence at the node of congestion. As the packet traverses the path from source to destination defined in the hop list, the status of congestion at each node is propagated to the destination. Thus the destination node receives, in the header, a collection of congestion bits. In one embodiment, the header is forwarded intact to the destination, with a hop identifiers for the entire path (and their associated congestion bits) being received intact in the header. In another embodiment, such as that illustrated in FIG. 4, as the packet propagates from the source to the destination, once an intermediate node is reached, the hop identifier for the node is stripped from the header. The congestion bits, however, remain intact in the header. Thus, in FIG. 4, congestion fields 40, 41, 42 and 43 remain intact at the destination node, although the overall length of the header is reduced. The index field, which indicates the number of hops in the path, can be used to parse the header to determine how many of the leading bits should be interpreted as congestion bits, thereby enabling each node to obtain the proper next hop identifier for forwarding purposes.

In FIGS. 3 and 4, the congestion field is also shown to include a Backwards Congestion Indicator (BCI) 46. When the next packet is transferred from the destination back to the source, a Backwards Congestion Indicator bit (BCI) is set for each hop indicator that had a corresponding FCI bit set on a source/destination transmission. As the packet propagates through the network, the BCI bits traverse the network unmodified, such that when the packet is received at the source, the source has an accurate view of the state of congestion on the previous source to destination communication. Although two distinct bits (FCI and BCI) have been described, it is appreciated that the functionality could be achieved with one or more bits, and thus the selection of bits is a matter of design choice and not a limitation of the present invention. For example, different 'congestion' bits may be used to indicate different types of resource conflicts at the node, thereby allowing a user to differentiate between power supply resource conflicts and transport medium resource conflicts. Any manner or use of bits indicating different network characteristics are included herein.

Figure 5:
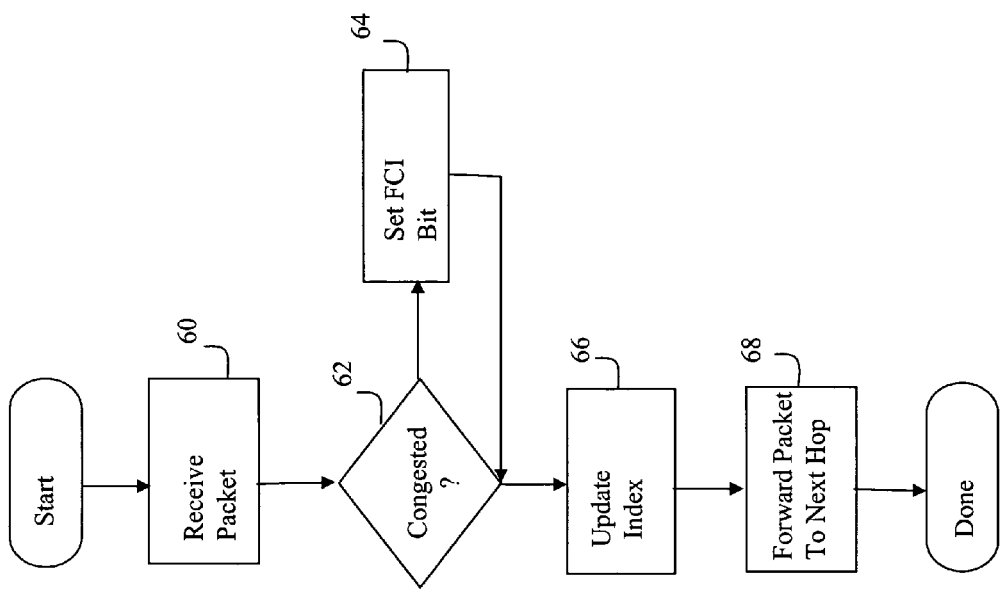
FIG. 5 is a flow diagram illustrating exemplary steps that are taken at a node in a source routed network to set the congestion field of the packet header of FIG. 3.
Figure 6:
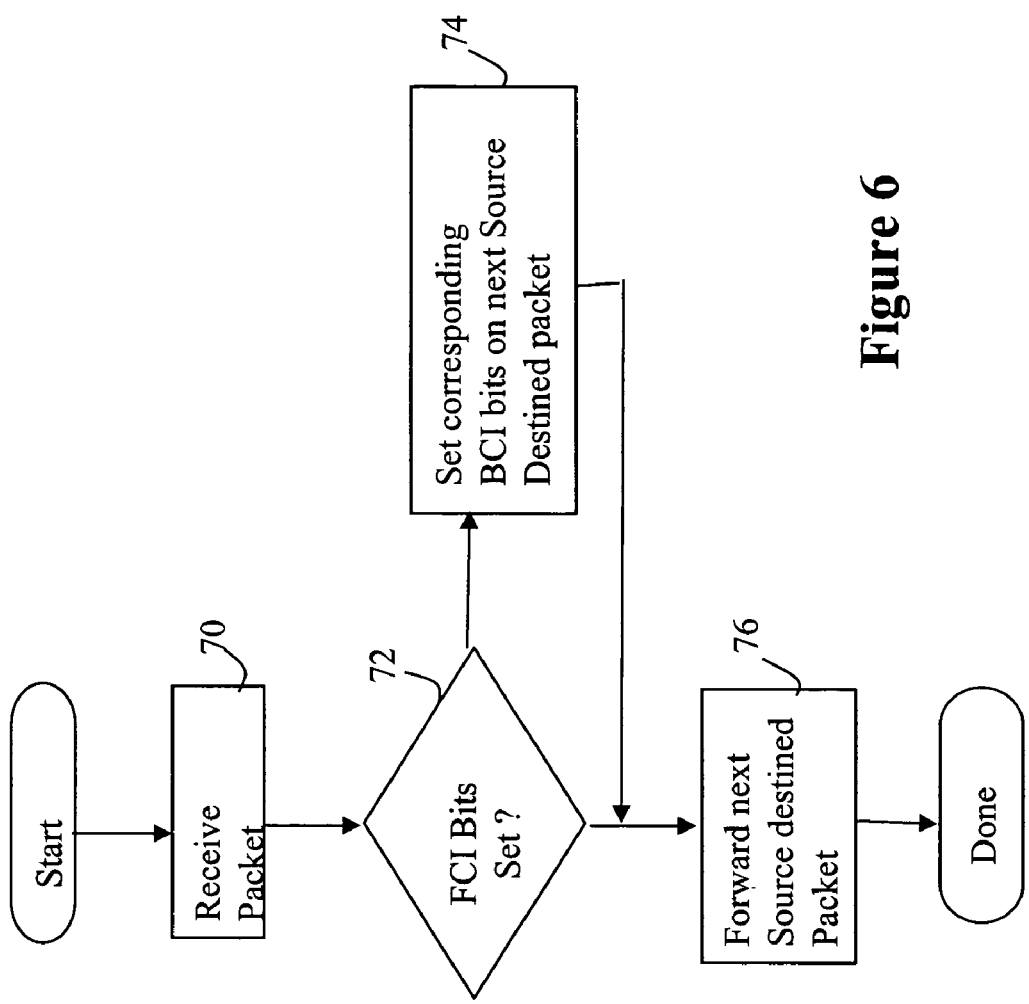
FIG. 6 is a flow diagram illustrating exemplary steps that may be taken at a destination node in a source routed network to reflect congestion information back to the source node.
Figure 7:
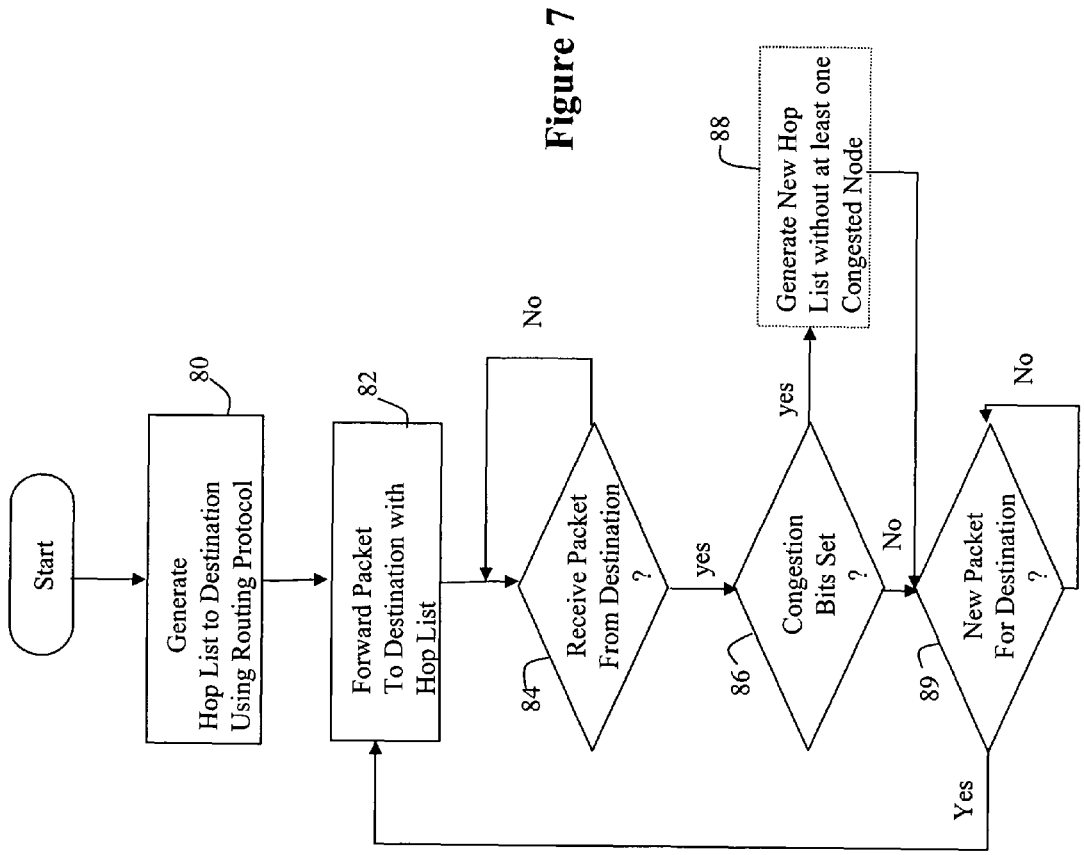
FIG. 7 is a flow diagram illustrating exemplary steps that may be taken at a source node in a source routed network for managing forwarding hop lists using the congestion information provided in the packet header of FIG. 3 according to the present invention.

Referring now to FIGS. 5-7, a series of flow diagrams illustrating exemplary processes that may be performed at the source, destination and intermediate nodes will now be described. It is appreciated that the processes could be implemented in a variety of manners, and the flow diagrams provide only one illustrative example of achieving the desired result. The present invention is thus not limited to the exact sequence of steps or delineation of functions illustrated in the diagrams.

FIG. 5 illustrates a method that may be used at an intermediate or destination node for setting the FCI bits as the packet propagates from source to destination. At step 60, the packet is received at the node. At step 62, various status within the node is evaluated to determine a congestion level at the node. If it is determined at step 62 that the congestion level is unsatisfactory, then at step 64 the FCI bit corresponding to the hop identifier associated with the node is set to indicate congestion. At step 66, the index value is updated, and at step 68 the packet is forwarded to the next hop in the hop list.

FIG. 6 illustrates a method that may be used at a destination node to reflect the congestion status back to the source node. Note that the congestion data may be reflected back in a packet traveling on any path back to the source node, it need not be the same path as taken during the source to destination communication. Thus the congestion information may travel via an explicit packet with no data (from the destination or intermediate nodes) or via information appended to a packet that is going a different route. At step 70, the packet from the source is received at the destination. At step 72, the header of the packet is examined to determine whether any of the FCI bits were set during the communication. If so, at step 74 the corresponding BCI bits are set on the next packet destined for the source, and at step 76 that packet is forwarded to the source.

FIG. 7 illustrates several steps that may be performed at a source in a source routed network to identify and manage congestion in a communication path. At step 80 a hop list enabling communication with a destination node is generated according to a selected routing protocol. At step 82, a packet destined for the destination is forwarded from the source to the first hop identified in the hop list. At step 86, when it is determined that a packet is received from the destination, the congestion fields of the header are evaluated to determine whether there is congestion in the transmission path from the source to the destination. If congestion bits are set, the source may perform any variety of tasks, including backing off the transmission rate on the path. However, in one embodiment, the source advantageously executes the routing protocol to generate a new hop list that removes one or more of the congested nodes from the transmission path between the source and the destination. Subsequent transmissions to the destination utilize the updated hop list.

Figure 8:
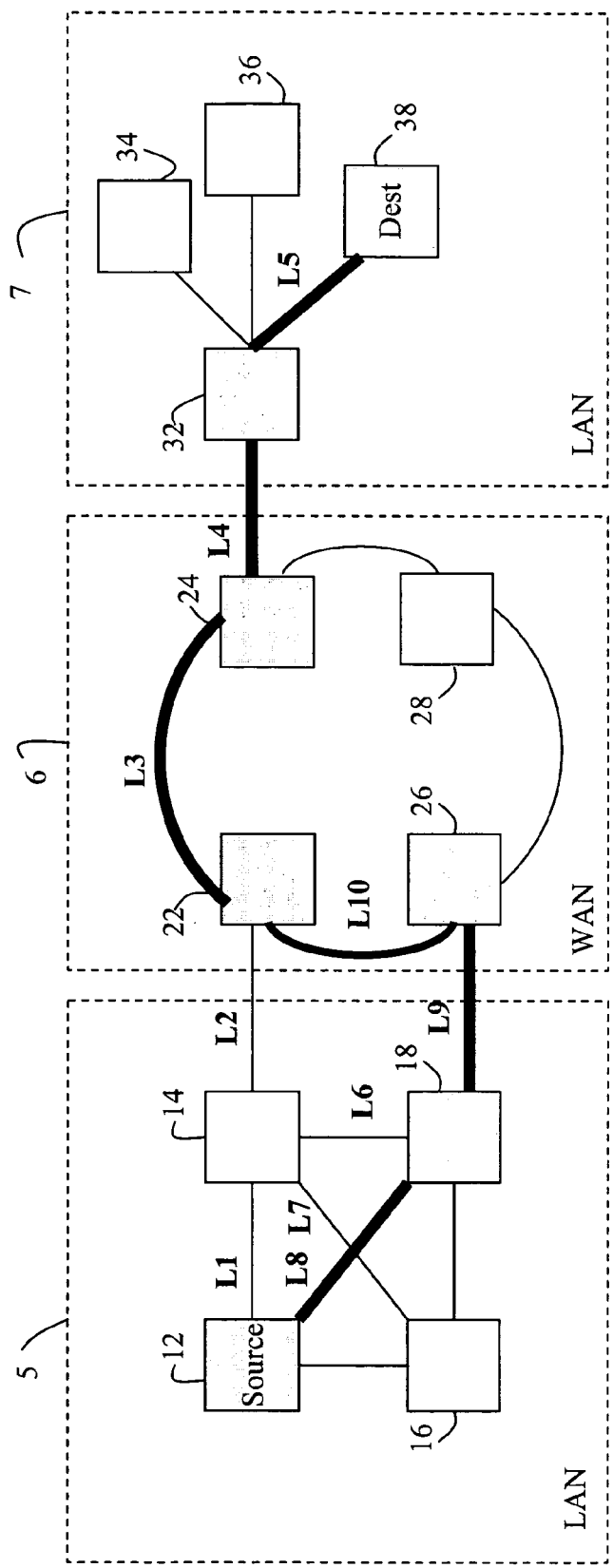
FIG. 8 is a diagram illustrating how the path of FIG. 2 is re-routed due to receipt of congestion information at the source of the source routed network.

For example, referring now to FIG. 8, assume that in the transmission from source 12 to destination 38 of a packet as in FIG. 2A, and the FCI bit corresponding to Link 1 is set to indicate congestion on the link. A packet subsequently forwarded from the destination 38 to the source 12 has the BCI bit associated with link 1 set to indicate that congestion occurred in the prior transmission. The source, recognizing the congestion, executes the routing protocol and selects an alternative path which uses Links L8, L9 and L10 in place of Links L1 and L2. The remainder of the path, which is operating without congestion, is left in tact.

Figure 9:
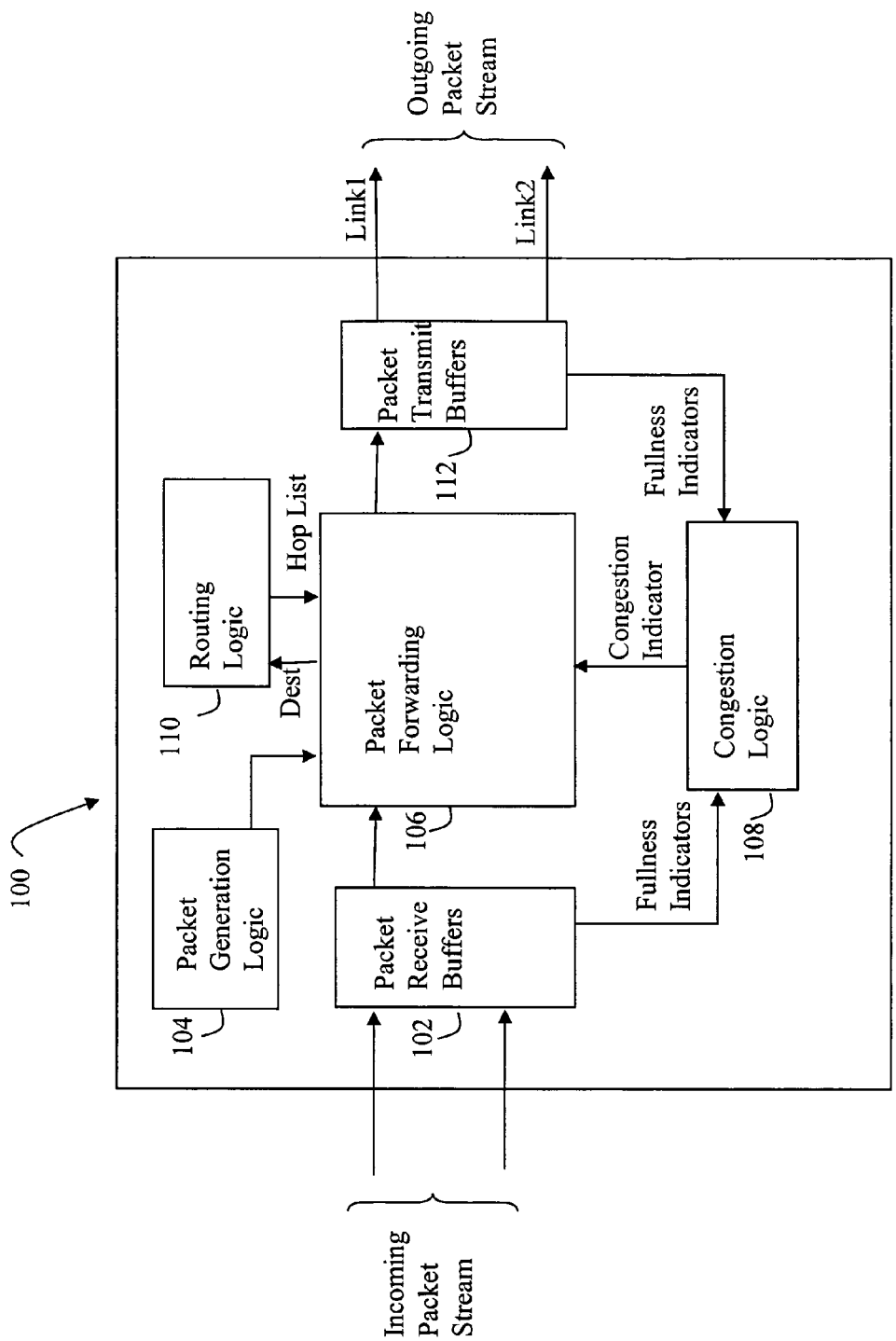
FIG. 9 is a block diagram of several exemplary components that may be included in a network device capable of implementing the present invention.

Referring briefly to FIG. 9, a block diagram illustrating several components that may be included in a network device implementing the present invention are shown. The components are illustrated as blocks which perform certain described functions, and it is appreciated that their functionality may be implemented in hardware, software or a combination thereof. Therefore the present invention is not limited to any particular implementation or delineation of functionality shown in FIG. 9.

In one embodiment, the network device 100 includes a number of packet receive buffers 102 and packet transmit buffers 112. The packet receive buffers receive packets from an incoming packet data stream on any of the input links to the device. In addition, the packet receive buffers may also store packets generated by packet generation logic 104 within the network device. The packet transmit buffers 112 are used to forward packets over any outgoing device interface ports.

In one embodiment, the packet receive buffers and packet transmit buffers forward fullness indicators to congestion logic 108. The congestion logic 108 may evaluate the fullness of the buffers and determine that congestion is occurring depending upon a number of parameters, including but not limited to the type of traffic being received, a service level agreement for certain traffic, a number of dropped packets, etc. A congestion status indictor may be forwarded by the congestion logic to the packet forwarding logic 106. The congestion status indicator, although shown as a single signal, may in fact have a number of bits corresponding to the different transmit and receive buffers, and hence the different forwarding paths.

Packet forwarding logic 106 in essence moves data from the packet receive buffers to the packet transmit buffers responsive to various information contained in the packet header. For example, if the packet header includes a hop indicator indicating that the next hop that a packet is to take is to link2, the packet forwarding logic forwards the packet to the appropriate transmit buffer. If a congestion indicator is set to indicate congestion on the incoming or outgoing link, the FCI bit associated with the link is set to indicate congestion by the packet forwarding logic prior to the transfer of the packet to the receive buffer.

A network device may also include routing logic 110. Most network devices are source devices at some point in the transmission, and thus will generate a hop list using a selected routing protocol. The routing logic 110 is used as described with regards to FIG. 7 to generate and update hop lists according to the BCI information received from the packet forwarding logic.

Accordingly a method and apparatus for identifying and managing congestion in a source routed network has been shown and described, wherein 'congestion' can be any form of resource conflict that may be encountered in a transmission path. By associating a congestion indicator with each hop in a path, a finer granularity of congestion indication can be attained. This information can then be fed back into a higher layer routing protocol, enabling paths to be selected that can operate at a high bandwidth without congestion. The present invention thus improves on the prior art congestion management techniques which simply reduce packet transmission rate, and concomitantly network performance, in order to reduce the effects of congestion.

The above description and Figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed.

FIGS. 5-7 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system maybe embodied using a variety of specific command structures. Accordingly, the invention should not be viewed as limited except by the scope and spirit of the appended claims.

The invention claimed is:

1. A node disposed in a path between a source node and a destination node in a source routed network, the path comprising a plurality of hops including the node, the node including an apparatus for indicating congestion at the node, the apparatus comprising:
a packet forwarding interface for receiving a packet transmitted from the source node and for forwarding the packet to the destination node, the packet including a header and a payload, the header having a plurality of ordered bit fields, each of the plurality of ordered bit fields corresponding to a respective hop of the plurality of hops and comprising a hop identifier that identifies the respective hop in the path traversed by the packet, and a corresponding congestion field configured to indicate a state of congestion at the respective hop; and
means for setting the congestion field corresponding to the hop identifier associated with the node in response to an indication of congestion at the node.

2. The node of claim 1, wherein the hop identifier is a label of the respective hop in the path between the source node and the destination node.

3. The node of claim 1, wherein the hop identifier is an address of the respective hop in the path between the source node and the destination node.

4. The node of claim 1, wherein the congestion field includes a forward congestion indicator, for indicating that congestion was detected at the respective hop during transmission of data from the source node to the destination node.

5. The node of claim 1, wherein the congestion field includes a backward congestion indicator, for indicating that congestion was previously detected at the respective hop during transmission of previous data from the source node to the destination node.

6. A source node in a source routed network, the source node comprising:
a packet receive interface that receives a packet sent from a destination node, the packet comprising a payload and a header identifying a plurality of hops in a path between the source node and a destination node taken by a previous packet transmitted between the source node and the destination node, the header having a plurality of ordered bit fields, each of the plurality of ordered bit fields comprising a hop identifier that corresponds to and identifies a respective hop in the path traversed by the packet, and a congestion field indicating congestion at the respective hop; and routing program code, stored on a computer readable medium of the source node and which identifies a different path between the source node and the destination node responsive to one or more of the congestion fields in the header for routing a subsequent packet.

7. The source node of claim 6, wherein each congestion field includes a forward congestion indicator field for indicating congestion at the respective hop in the path during transmission of the previous packet from a source node to the destination node.

8. The source node of claim 6, wherein each congestion field includes a backward congestion indicator field for indicating congestion at the respective hop during transmission of the packet from the destination node to the source node.

9. The source node of claim 6, wherein the hop identifier is a label.

10. The source node of claim 6, wherein the identifier is a link.

11. The source node of claim 6, wherein the hop identifier is an address.

12. A network device comprising:
a packet memory for storing a packet received at the network device, the packet comprising a payload and a header, the header including:
a list of a plurality of hops between a source node and a destination node; and
for each hop in the list of the plurality of hops, an identifier for identifying the associated hop and a corresponding congestion field configured to identify a state of congestion at the associated hop, and means for setting the congestion field corresponding to the identifier of the associated hop in response to an indication of congestion at the associated hop; and
means for forwarding the packet from the packet memory to another device.

13. The network device of claim 12, wherein the congestion field includes a forward congestion indicator field for indicating congestion at the associated hop during transmission of the packet from the source node to the destination node.

14. The network device of claim 12, wherein the congestion field includes a backward congestion indicator field for indicating congestion at the associated hop during transmission of a previous packet from the source node to the destination node.

15. The network device of claim 12, wherein the associated hop is identified by a label.

16. The network device of claim 12, wherein the associated hop is identified by a link.

17. The network device of claim 12, wherein a hop identifier is identified by an address.

18. A method for indicating congestion at a node in a source routed network including the steps of:
receiving a packet at the node, the packet including a payload and a header having a plurality of ordered bit fields, each of the plurality of ordered bit fields corresponding to a respective hop of a plurality of hops in a path between a source node and a destination node, each of the plurality of ordered bit fields comprising an identifier of the respective hop in the path, and a congestion field for indicating a state of congestion at the respective hop;
detecting a congestion condition at the node;
setting the congestion field corresponding to the identifier associated with the node in response to an indication of congestion at the node; and
transmitting the packet to the destination node.

19. The method of claim 18, wherein the identifier identifies a link in the path between the source node and the destination node.

20. The method of claim 18, wherein the identifier is a label of a hop in the path between the source node and the destination node.

21. The method of claim 18, wherein the identifier is an address of a hop in the path between the source node and the destination node.

22. The method of claim 18, wherein the congestion field includes a forward congestion indicator, for indicating that congestion was detected at the respective hop during transmission of data from the source node to the destination node.

23. The method of claim 18, wherein the congestion field includes a backward congestion indicator, for indicating that congestion was previously detected at the respective hop during transmission of previous data from the source node to the destination node.

24. A method of generating a hop list in a source routed network including the steps of:
receiving, at a source, a packet from a destination, the packet including a payload and a header comprising a plurality of bit fields, each bit field corresponding to a respective hop in a first plurality of hops in a first path and comprising a hop identifier that identifies the respective hop in the first path between the source and the destination, and comprising a congestion field configured to indicate a state of congestion at the respective hop; and
based on the state of congestion indicated in at least one of the plurality of bit fields, generating the hop list identifying a second plurality of hops that differs from the first plurality of hops to define a second path for a subsequent packet to traverse in subsequent communications between the source and the destination, wherein the second plurality of hops does not include the hop corresponding to the at least one of the plurality of bit fields.

25. A source routed network comprising a source node and a destination node coupled in a path by a plurality of intermediate nodes, the source routed network including:
means, including a packet comprising a payload and a header, the header comprising a plurality of ordered bit fields, each bit field corresponding to a particular intermediate node of the plurality of intermediate nodes in the path and comprising an identifier for identifying the particular intermediate node and a corresponding congestion field configured to identify a congestion state of the particular intermediate node, for indicating a state of congestion of each of the plurality of intermediate nodes to the source node; and
means, responsive to the state of congestion of each of the plurality of intermediate nodes, for updating the path by removing at least one of the intermediate nodes from the path, thereby generating an updated path.

26. The source routed network of claim 25, wherein the path between the source node and the destination node is specified by a list of hops specifying an ordered traversal of the plurality of intermediate nodes, and wherein the means for indicating the state of congestion of each of the plurality of intermediate nodes includes a congestion field associated with each of the hops in the list, the congestion field indicating a relative congestion of the associated hop in the list.

27. The source routed network of claim 26, wherein the list of hops includes a list of links in the path.

28. The source routed network of claim 26, wherein the list of hops includes a list of labels in the path.

29. The source routed network of claim 26, wherein the list of hops includes a list of addresses of the plurality of intermediate nodes in the path.

30. A node disposed in a path between a source node and a destination node in a source routed network, the path comprising a plurality of hops including the node, the node including an apparatus for indicating a resource conflict at the node, the apparatus comprising:

a packet forwarding interface for forwarding a packet received at the node, the packet including a header and a payload, the header having a plurality of ordered bit fields, each of the plurality of ordered bit fields comprising an identifier of a respective hop of the plurality of hops, and a resource conflict field configured to identify at least one resource conflict at the respective hop; and means for setting the resource conflict field corresponding to the identifier of the respective hop in response to an indication of resource conflict at the node.

* * * * *